United States Patent
Bedell et al.

(10) Patent No.: US 8,753,528 B2
(45) Date of Patent: Jun. 17, 2014

(54) ETCHANT FOR CONTROLLED ETCHING OF GE AND GE-RICH SILICON GERMANIUM ALLOYS

(71) Applicants: International Business Machines Corporation, Armonk, NY (US); S.O.I.TEC Silicon on Insulator Technologies, Bernin (FR)

(72) Inventors: Stephen W. Bedell, Wappingers Falls, NY (US); Keith E. Fogel, Hopewell Junction, NY (US); Nicolas Daval, Pleasantville, NY (US)

(73) Assignees: International Business Machines Corporation, Armonk, NY (US); S.O.I.TEC Silicon on Insulator Technologies, Bernin (FR)

( * ) Notice: Subject to any disclaimer, the term of this patent is extended or adjusted under 35 U.S.C. 154(b) by 0 days.

(21) Appl. No.: 13/758,521

(22) Filed: Feb. 4, 2013

(65) Prior Publication Data
US 2013/0146805 A1 Jun. 13, 2013

Related U.S. Application Data

(62) Division of application No. 12/904,224, filed on Oct. 14, 2010.

(51) Int. Cl.
  *C03C 15/00* (2006.01)
(52) U.S. Cl.
  USPC ........... 216/99; 438/694; 252/79.1; 252/79.2; 252/79.3; 252/79.4
(58) Field of Classification Search
  USPC .................... 216/99; 438/694; 252/79.1–79.4
  See application file for complete search history.

(56) References Cited

U.S. PATENT DOCUMENTS

| 6,828,587 B2 | 12/2004 | Yamazaki |
| 7,172,930 B2 | 2/2007 | Adam et al. |
| 7,452,481 B2 | 11/2008 | Suzuki |

(Continued)

FOREIGN PATENT DOCUMENTS

| EP | 1980607 | 10/2008 |
| WO | WO2010039936 | 4/2010 |

OTHER PUBLICATIONS

Bloem et al. Journal of Electrochemical Socieity, vol. 109, No. 1, (1962) pp. 33-36.*

(Continued)

*Primary Examiner* — Nadine Norton
*Assistant Examiner* — Maki Angadi
(74) *Attorney, Agent, or Firm* — Scully, Scott, Murphy & Presser, P.C.; Yuanmin Cai

(57) ABSTRACT

The present disclosure provides a chemical etchant which is capable of removing Ge and Ge-rich SiGe alloys in a controlled manner. The chemical etchant of the present disclosure includes a mixture of a halogen-containing acid, hydrogen peroxide, and water. Water is present in the mixture in an amount of greater than 90% by volume of the entire mixture. The present disclosure also provides a method of making such a chemical etchant. The method includes mixing, in any order, a halogen-containing acid and hydrogen peroxide to provide a halogen-containing acid/hydrogen peroxide mixture, and adding water to the halogen-containing acid/hydrogen peroxide mixture. Also disclosed is a method of etching a Ge or Ge-rich SiGe alloy utilizing the chemical etchant of the present application.

13 Claims, 2 Drawing Sheets

(56) References Cited

U.S. PATENT DOCUMENTS

2003/0209514 A1 11/2003 Ramachandran et al.
2004/0137698 A1* 7/2004 Taraschi et al. ............... 438/458
2009/0017626 A1* 1/2009 Park et al. .................... 438/694
2010/0227461 A1 9/2010 Ochi

OTHER PUBLICATIONS

S. Wolf et al. Silicon Processing for the VLSI Era, vol. 1 (1986) Latttice Press, pp. 516-517.*
Wolf, S., et al., "Silicon Processing for the VLSI era", Sep. 2000, vol. 1, Lattice Press, pp. 516-517.
Office Action dated Jan. 31, 2013 received in the parent U.S. Patent Application, namely U.S. Appl. No. 12/904,224.
Blem, J., et al., Journal of the Electrochemical Society, 1962, vol. 109, No. 1, pp. 33-36.
Report on the International Search Report.
Bloem, J., et al., "Etching Ge with Mixtures of HF-H2O2-H2O", J. Electrochem. Soc., 1962, pp. 33-36, vol. 109, Issue 1.
Irving, B. A., "Shapes of Etch Hillocks and Pits and Their Correlation with Measured Etch Rates", Journal of Applied Physics, Jan. 1960, pp. 109-111, vol. 31, No. 1.
Camp, P. R., "A Study of the Etching Rate of Single-Crystal Germanium", J. Electrochem. Soc., 1955, pp. 586-593, vol. 102, Issue 10.
Frank, F. C., et al. "Orientation-Dependent Dissolution of Germanium", Journal of Applied Physics, Nov. 1960, pp. 1996-1999, vol. 31, No. 11.
Batterman, B. W., "Hillocks, Pits, and Etch Rate in Germanium Crystals", Journal of Applied Physics, Nov. 1957, pp. 1236-1241, vol. 28, No. 11.
Ellis, S. G., "Surface Studies on Single-Crystal Germanium", Journal of Applied Physics, Nov. 1957, pp. 1262-1269, vol. 28, No. 11.

* cited by examiner

ETCHANT FOR CONTROLLED ETCHING OF GE AND GE-RICH SILICON GERMANIUM ALLOYS

CROSS REFERENCE TO RELATED APPLICATION

This application is a divisional of U.S. patent application Ser. No. 12/904,224, filed Oct. 14, 2010 the entire content and disclosure of which is incorporated herein by reference.

BACKGROUND

The present disclosure relates to semiconductor manufacturing, and in particular, to a method of etching germanium (Ge) and Ge-rich silicon germanium (SiGe) alloys in a controlled manner. The present disclosure also relates to a chemical etchant that can be used for the controlled etching of Ge and Ge-rich SiGe alloys and a method of making such a chemical etchant.

Germanium is being considered as a possible replacement for silicon in future high performance integrated circuit (IC) manufacturing, as well as, possible use in integrated photodetectors. One of the biggest issues in processing Ge and Ge-rich SiGe alloys is the high reactivity of these materials with most conventional chemical etchants as well as reactive ion etching (RIE) chemistries.

Although there are known wet chemical etchants that can remove Ge, such as, for example, hydrogen peroxide ($H_2O_2$), there are no known etchants which remove Ge in a controlled manner. Specifically, most prior art chemical etchants employed for etching Ge-containing materials tend to roughen the Ge surface significantly rendering the Ge surface unusable for device manufacturing. In additional, most prior art chemical etchants remove Ge inhomogeneously due to a variable incubation time leading to inconsistent etch rates across the wafer.

In order to adopt Ge into any semiconductor processing flow including conventional complementary metal oxide semiconductor (CMOS) processing flows, there is a need for a well-behaved germanium etchant that does not suffer from the problems described above.

SUMMARY

The present disclosure provides a chemical etchant which is capable of removing Ge and Ge-rich SiGe alloys in a controlled manner. By "Ge-rich SiGe alloys" it is meant a silicon germanium (SiGe) alloy in which the germanium content is equal to, or greater than, 50 atomic percent. By "controlled manner" it is meant that the surface roughness of the etched germanium-containing material does not increase substantially and the removal is uniform across the wafer. More specifically, the surface roughness does not increase by more that 10% of RMS value per 100 nm of the germanium-containing material etched, and the uniformity of the etch rate across the wafer is typically better than 5%.

The chemical etchant employed in the present disclosure for such controlled etching of Ge and Ge-rich SiGe alloys includes a mixture of a halogen-containing acid, hydrogen peroxide, and water. Attempts to use highly diluted hydrogen peroxide (a known chemical etchant) to control the etch rate experimentally resulted in the inhomogeneous removal of Ge as described above. The addition of a small quantity of a halogen-containing acid such as, for example, hydrofluoric acid, changed the etching behavior of the solution such that the etching was uniform across the wafer, and the etch rate could be controlled (and reproduced) by adjusting the dilution in water.

The applicants of this disclosure have also found through experimentation that the order of chemical mixing the components mentioned above is an important variable to achieve the desired result. For example, mixing a halogen-containing acid and hydrogen peroxide prior to the addition of water resulted in an etchant solution that was capable of etching Ge and Ge-rich SiGe alloys in a controlled manner and ready to use immediately after preparation, whereas adding a halogen-containing acid and hydrogen peroxide to an existing volume of water resulted in a solution that required a waiting time of 48 hours before reaching its nominal etch rate and being usable.

In one aspect, a chemical etchant for controlled etching of Ge or a Ge-rich SiGe alloy is provided. In one embodiment, the chemical etchant of the present application comprises a mixture of a halogen-containing acid, hydrogen peroxide, and water, wherein the water is present in an amount of greater than 90, typically greater than 98, % by volume of the total mixture. In another embodiment of the present application, the chemical etchant consists essentially of a mixture of a halogen-containing acid, hydrogen peroxide, and water, wherein the water is present in an amount of greater than 90, typically greater than 98, % by volume of the total mixture. In yet a further embodiment of the present application, the chemical etchant consists of a mixture of a halogen-containing acid, hydrogen peroxide, and water, wherein the water is present in an amount of greater than 90, typically greater than 98, % by volume of the total mixture.

In another aspect, a method of making a chemical etchant for the controlled etching of a Ge or a Ge-rich SiGe alloy is provided. The method of making the chemical etchant includes mixing, in any order, a halogen-containing acid and hydrogen peroxide to provide a halogen-containing acid/hydrogen peroxide mixture, and adding water to the halogen-containing acid/hydrogen peroxide mixture to provide a solution of the halogen-containing acid, hydrogen peroxide, and water, wherein the water is present in an amount of greater than 90, typically greater than 98, % by volume of the total solution.

In yet a further aspect, a method of etching Ge or a Ge-rich SiGe alloy is provided. The method includes contacting a surface of Ge or a Ge-rich SGe alloy with a chemical etchant, said chemical etchant comprising a mixture of a halogen-containing acid, hydrogen peroxide, and water, wherein the water is present in an amount of greater than 90, typically greater than 98, % by volume of the total mixture.

DETAILED DESCRIPTION

Figure 1:
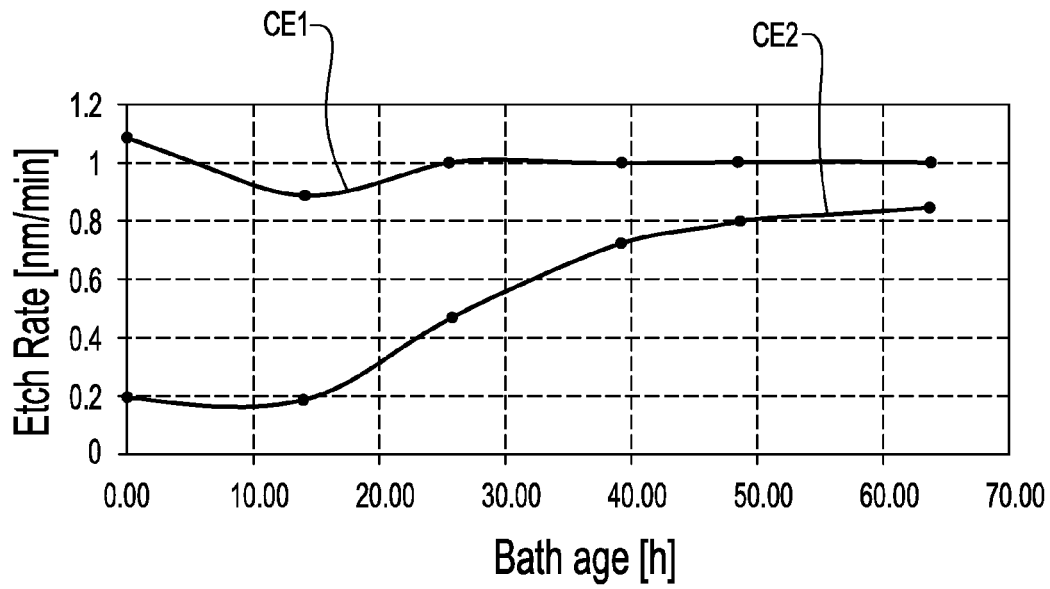
FIG. 1 is a graph depicting germanium Etch Rate (nm/min) vs. Bath Age (h) for a chemical etchant (CE1) made by first mixing the hydrogen peroxide and hydrofluoric acid together and then adding the water while a chemical etchant (CE2) made by adding hydrogen peroxide and hydrofluoric acid separately to the water. Although the same ingredients are added to create the etchant mixtures, the order of mixing changes the concentrations of secondary species within the mixture as equilibrium is established. Therefore, despite having the same constituent ingredients, CE1 and CE2 are not equivalent mixtures. CE1 has consistent and usable etching characteristics over the lifetime of the bath, whereas CE2 does not.

The present disclosure, which provides a chemical etchant for etching of Ge and Ge-rich SiGe alloys in a controlled manner, will now be described in greater detail by referring to the following discussion and drawings that accompany the present application. It is noted that the drawings are provided for illustrative purposes only and are not drawn to scale.

In the following description, numerous specific details are set forth, such as particular structures, components, materials, dimensions, processing steps and techniques, in order to illustrate the present disclosure. However, it will be appreciated by one of ordinary skill in the art that various embodiments of the present disclosure may be practiced without these, or with other, specific details. In other instances, well-known structures or processing steps have not been described in detail in order to avoid obscuring the various embodiments of the present disclosure.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As stated above and in one embodiment, the present application provides a chemical etchant, i.e., etchant solution, that is capable of removing Ge and Ge-rich SiGe alloys in a controlled manner. That is, the chemical etchant of the present application is capable of removing Ge and Ge-rich SiGe alloys such that the surface roughness of the etched Ge or Ge-rich SiGe alloy does not increase significantly and such that the removal is uniform across the entire surface of the wafer. More specifically, the surface roughness does not increase by more that 10% of RMS value per 100 nm of the germanium-containing material etched, and the uniformity of the etch rate across the wafer is typically better than 5%.

The chemical etchant of the present application comprises, consists essentially of, or consists of, a mixture of a halogen-containing acid, hydrogen peroxide, and water, wherein the water is present in an amount of greater than 90, typically greater than 98, % by volume of the total mixture. Applicants observe that etchant solutions containing a mixture of a halogen-containing acid, hydrogen peroxide and water are known to those skilled in the art. However, in such prior art mixtures the amount of water is typically less than 10% by volume of the total solution. Moreover, such prior art chemical etchants exhibit the problems of increases the surface roughness and etching in a non-uniform manner.

The halogen-containing acid that can be used in the present application includes hydrofluoric (HF) acid, hydrochloric (HCl) acid, hydrobromic (HBr) acid, and hydriodic (HI) acid. Mixtures of these halogen-containing acids can also be employed. In one embodiment of the present application, the halogen-containing acid that is employed in the chemical etchant is hydrofluoric (HF) acid.

The halogen-containing acids can be made using techniques well known to those skilled in the art. Alternatively, the halogen-containing acids can be purchased from any well known fine chemical supplier including, from example, Aldrich. In one embodiment, for example, the halogen-containing acid is semiconductor grade hydrofluoric acid 49%. Other concentrations can also be used as long as one can obtain the molecular concentration in the final solution.

The hydrogen peroxide that can be used in the instant application is typically a hydrogen peroxide solution containing 30% hydrogen peroxide in water. The hydrogen peroxide can be made using techniques well known to those skilled in the art. Alternatively, the hydrogen peroxide can be purchased from any well known fine chemical supplier including, from example, Aldrich. In one embodiment, for example, semiconductor grade oxygen peroxide 30% is employed. Other concentrations can also be used as long as one can obtain the molecular concentration of the final solution.

In one embodiment, the water that can be employed in the present application can be deionized water such as, for example, deionized water with a resistivity greater than 10 M.Ohm.

In one embodiment of the present application, the halogen-containing acid, the hydrogen peroxide and water are present in the chemical etchant in a ratio from 1:15:100 to 1:15:10000 (49% HF:30% hydrogen peroxide:deionized water). In another embodiment, the halogen-containing acid, the hydrogen peroxide and water are present in the chemical etchant in a ratio from 1:1:1000 to 1:50:1000. In a further embodiment, the halogen-containing acid, the hydrogen peroxide and water are present in the chemical etchant in a ratio from 1:15:1000 to 1:15:2000.

The chemical etchant of the present application is made by mixing, in any order, a halogen-containing acid and hydrogen peroxide to provide a halogen-containing acid/hydrogen peroxide mixture. In one embodiment of the present application, the mixing includes adding a halogen-containing acid to hydrogen peroxide. In another embodiment of the present application, the mixing includes adding hydrogen peroxide to a halogen-containing acid. In either embodiment, the first component, i.e., halogen-containing acid or hydrogen peroxide, is added to the second component, i.e., the other of the halogen-containing acid or the hydrogen peroxide not used as the first component, in a single addition or in incremental additions.

Notwithstanding the order of mixing the halogen-containing acid and the hydrogen peroxide, the ratio of halogen-containing acid to hydrogen peroxide that is mixed is typically from 1:5 to 1:50. More typically, and in another embodiment, the ratio of halogen-containing acid to hydrogen peroxide that is mixed is typically from 1:10 to 1:20. Even more typically, and in yet another embodiment, the ratio of halogen-containing acid to hydrogen peroxide that is mixed is typically from 1:12 to 1:17.

The mixing of the halogen-containing acid and the hydrogen peroxide can be performed in a reaction vessel such as a beaker that is equipped with a stirrer. The mixing of the halogen-containing acid and the hydrogen peroxide can be performed at nominal room temperature (i.e., a temperature from 18° C. to 25° C.). Alternatively, the mixing can be performed at an elevated temperature that is above nominal room temperature. In one embodiment, the mixing is performed at a temperature of from 18° C. to 50° C.

In one embodiment, the mixing can be performed in air or in the presence of an inert gas ambient such as He, Ar, Ne, Xe, $N_2$ or a mixture thereof. In another embodiment, the mixing of the halogen-containing acid and the hydrogen peroxide can be performed under vacuum.

Water is then added to the halogen-containing acid/hydrogen peroxide mixture to provide the chemical etchant described above. The amount of water that is added is typically sufficient to ensure that the chemical etchant contains water in an amount of greater than 90, typically greater than 98, % by volume of the total etchant solution. In one embodiment, water is added to the halogen-containing acid/hydrogen peroxide mixture in an amount from 90% to 99.9%. In another embodiment, water is added to the halogen-containing acid/hydrogen peroxide mixture in an amount from 97% to 99.5%. In another embodiment, water is added to the halogen-containing acid/hydrogen peroxide mixture in an amount from 98.4% to 99%.

The addition of water to the halogen-containing acid/hydrogen peroxide mixture can be performed in a single addition or in incremental additions. The addition of water to the halogen-containing acid/hydrogen peroxide mixture can be performed in a reaction vessel such as a beaker that is equipped with a stirrer. The addition of water to the halogen-containing acid/hydrogen peroxide mixture can be performed at nominal room temperature (i.e., a temperature from 18° C. to 25° C.). Alternatively, the addition of the water can be performed at an elevated temperature that is above nominal room temperature. In one embodiment, the addition of water is performed at a temperature of from 18° C. to 60° C.

In one embodiment, the addition of water to the halogen-containing acid/hydrogen peroxide mixture can be performed in air or in the presence of an inert gas ambient such as He, Ar, Ne, Xe, $N_2$ or a mixture thereof. In another embodiment, the addition of water to the halogen-containing acid/hydrogen peroxide mixture can be performed under vacuum.

It is observed that when the chemical etchant is made using the above mentioned sequence of processing steps the chemical etchant can be used immediately after it has been made. The applicants have determined that if any other order is used in making the chemical etchant one will need to wait several hours before the solution can be used. Without wishing to be bound by any theory, it is thought the halogen-containing acid and the hydrogen peroxide must react first to form some sort of compound or complex. It is further observed that the addition of a halogen-containing acid and hydrogen peroxide to an existing volume of water results in a solution that is similar to that without the halogen-containing acid.

Reference is now made to FIG. 1 which shows that the mixing order has an impact of the etch rate of the chemical etchant. Specifically, FIG. 1 is a graph of Etch Rate (nm/min) vs. Bath Age (h) for a chemical etchant (CE1) that was made in accordance with the method described above, i.e., first making the halogen-containing acid/hydrogen peroxide mixture and then added water to that mixture, and a chemical etchant (CE2) made using a different method than the present application, i.e., adding a halogen-containing acid/hydrogen peroxide mixture to water. It is shown that the CE1 reaches its nominal etch rate immediately after preparation of the solution as opposed to CE2 which needs more than 60 hours to reach its nominal etch rate and is unstable and unusable until then.

Figure 2:
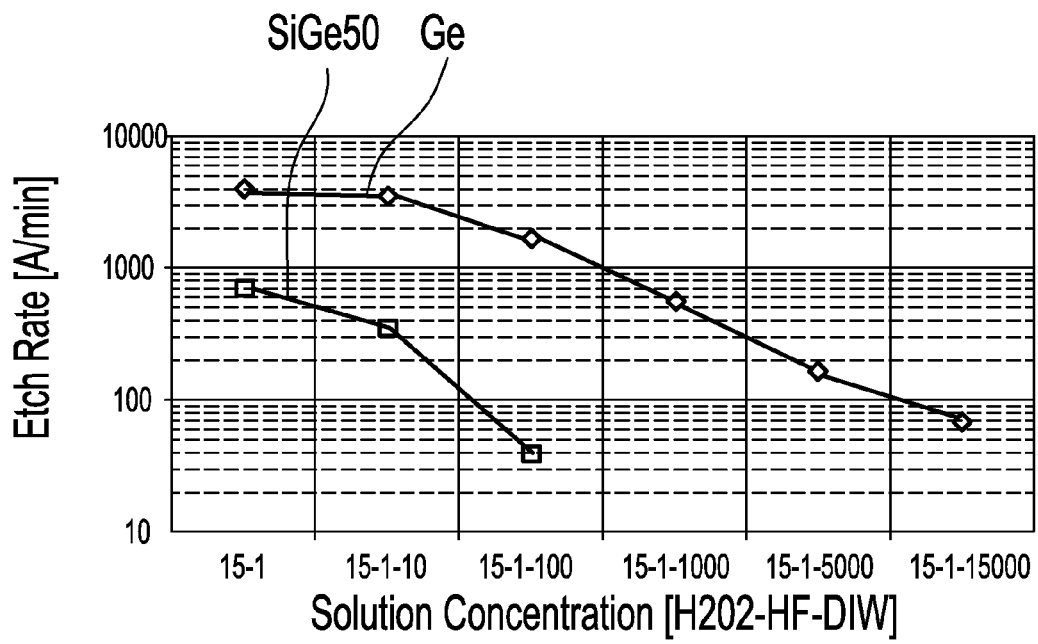
FIG. 2 is a graph depicting Etch Rate (nm/min) vs. Solution Concentration ($H_2O_2$-HF-Water) of a bulk germanium substrate (Ge) and a SiGe substrate including 50 atomic % Ge (SiGe50) etched with a chemical etchant having different solution concentrations.

Reference is now made to FIG. 2 which is a graph depicting germanium etch uniformity that can be obtained using the chemical etchant of the present application to etch various germanium-containing substrates. In particular, FIG. 2 is a graph depicting Etch Rate (nm/min) vs. Solution Concentration ($H_2O_2$-HF-Water) of a bulk germanium substrate (Ge) and a SiGe substrate including 50 atomic % Ge (SiGe50) etched with a chemical etchant having different solution concentrations. It is shown that the etch rate for such solution is very well controlled by the solution dilution varying from 70 Å (Angstroms)/min to 0.4 µm/min over the tested range of dilutions. It is also shown that the etch rate is faster for Ge than SiGe 50%, and expected to show the same trend for other SiGe alloy composition: the more Ge content, the faster the etch rate.

The chemical etchant of the present application can be used to for the controlled etching of Ge or a Ge-rich SiGe alloy. The Ge or Ge-rich SiGe alloy can be a substrate or a material layer that is formed atop another material layer. The another material layer can be a semiconducting material, an insulating material, a conductive material, or any combination and/or mutilayered stack thereof. By "semiconducting material" it is meant any material such as, for example, Si, SiGe, SiGeC, SiC, InAs, InP, and GaAs that has semiconducting properties. By "insulating material" it is meant any material such as, for example, an oxide, a nitride or an oxynitride that has insulating properties. By "conductive material" it is meant any material such as, for example, an elemental metal, elemental metal alloy, elemental metal nitride or elemental metal silicide which contains movable electric charges.

The Ge substrate or layer can be provided utilizing any technique that is well known to those skilled in the art. Likewise, the Ge-rich SiGe alloy substrate or layer can be provided utilizing any technique that is well known to those skilled in the art. As mentioned above, the Ge-rich SiGe alloy has a germanium content of 50 atomic % or greater. Typically, the Ge-rich SiGe alloy has a Ge content of from 50 atomic % to 100 atomic %. The Ge or Ge-rich SiGe alloy may be single crystalline, polycrystalline or amorphous. Typically, the Ge and Ge-rich SiGe alloys are single crystalline materials.

The method of the present application for the controlled etching of Ge or a Ge-rich SiGe alloy includes contacting a surface of Ge or a Ge-rich SGe alloy with the chemical etchant of the present application. The contacting of the Ge or Ge-rich SiGe alloy with the chemical etchant of the present application can result in either complete removal of the Ge or Ge-rich SiGe alloy that is being contacted or it can be used to partially remove, i.e., thin, the Ge or Ge-rich SiGe alloy that is being contacted. Following the contacting step, the structure including the now etched Ge or Ge-rich SiGe alloy can be rinsed to remove any etched residue from the etched Ge or Ge-rich SiGe alloy. The rinse can be performed utilizing deionized water.

The contacting step described above may be performed at nominal room temperature (i.e., a temperature from 18° C. to 25° C.). Alternatively, the contacting step described above can be performed at an elevated temperature that is above nominal room temperature. In one embodiment, the contacting step is performed at a temperature of from 18° C. to 60° C.

In one embodiment, the contacting step described above occurs across the entire surface of Ge or the Ge-rich SiGe alloy. In another embodiment, the contacting step described above occurs on preselected regions of Ge or a Ge-rich SiGe alloy. The preselected regions can be provided by providing a patterned etch mask over those portions of Ge or the Ge-rich SiGe alloy in which etching is not desired.

Alternatively, the preselected regions can be formed by damaging portions of the Ge or Ge-rich SiGe alloy by ion implantation. This particular embodiment is now described in further detail. Reference is now made to FIGS. 3A-3D which illustrate an embodiment of the present application in which a chemical etchant of the present application is employed to selectively etch undamaged regions of a Ge substrate relative to at least one damaged region of the substrate; the damaged region is formed by ion implantation. It is observed that although a Ge substrate is described and illustrated, the method described herein below in relationship with FIGS. 3A-3D can also be applied to Ge-rich SiGe alloys.

Figure 3A:
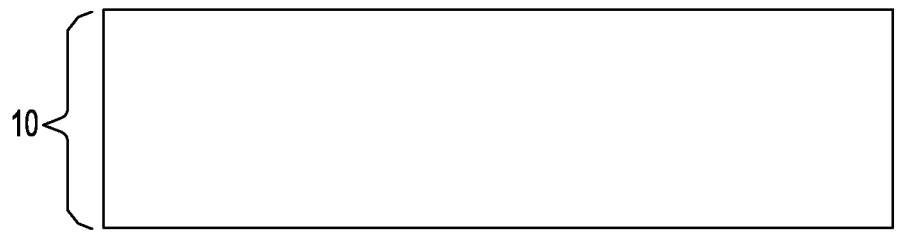
FIG. 3A-3D illustrate an embodiment of the present application in which a chemical etchant of the present application is employed to selectively etch undamaged regions of a Ge substrate relative to at least one damaged region of the substrate; the damaged region is formed by ion implantation.
Figure 3B:
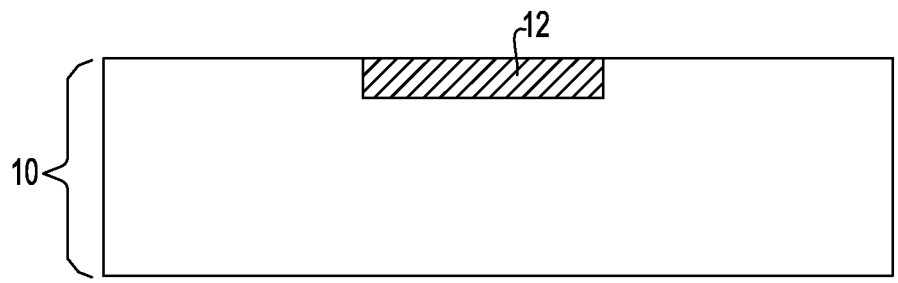

FIG. 3A illustrates an initial Ge substrate 10 that can be employed. FIG. 3B illustrates the structure that is formed after forming at least one damaged region 12 within the Ge substrate 10. The at least one damaged region 12 is formed utilizing an implantation step in which ions such as, for example, Ge are introduced into selected regions of the Ge substrate. An implantation mask can be formed on the Ge substrate 10 prior to the ion implantation and then removed after the ion implantation utilizing conventional processes and materials well known to those skilled in the art. The energy of the ion implantation and dose of the ions being implanted may vary depending on the thickness of the germanium rich layer that needs to be kept from etching. Typically, Ge ion implantation at the energy of 150 keV with a dose 1E15 has been used to form a 2000 Å thick layer more resistant to the etch.

Figure 3C:
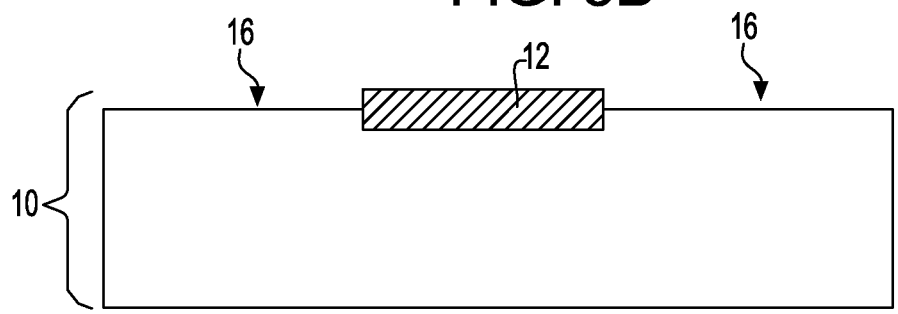

After forming the at least one damaged region 12 within Ge substrate 10, the Ge substrate 10 including the at least one damaged region 12 is contacted with the chemical etchant of the present application. The contact results in partially removing, i.e., etching, the undamaged portions of the Ge substrate relative to the at least one damaged region 12. FIG. 3C illustrates the structure that is formed after contacting the same with the chemical etchant of the present application; reference numeral 16 denotes the etched portions of the Ge substrate.

Figure 3D:
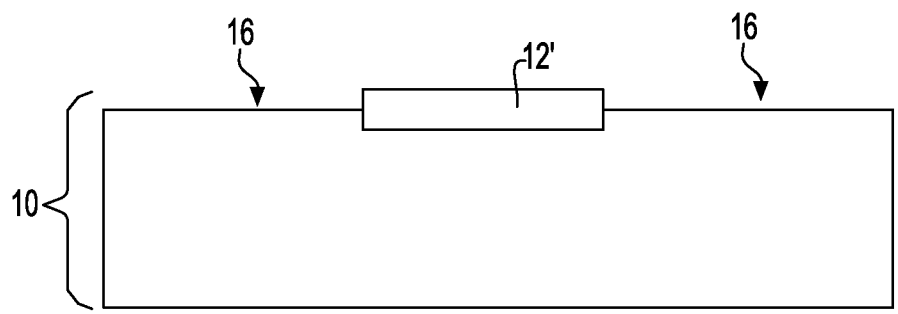

Next, and as shown in FIG. 3D, the structure shown in FIG. 3C is subjected to an annealing step which converts, i.e., heals, the at least one damaged region 12 back to an undamaged region that has the same crystal structure as the original Ge substrate 12. In FIG. 3D, reference numeral 16 denotes the etched portions of the Ge substrate, and reference numeral 12' denotes the unetched portion of the substrate in which the at least one damaged region 12 has been healed. The anneal that can be used to heal the damaged region is performed at a temperature of 350° C. or greater. More typically, the anneal that can be sued to heal the damaged region is performed at a temperature from 500° C. to 800° C. The anneal that can be used to heal the damaged region can be a furnace anneal, a rapid thermal anneal, a laser anneal or a microwave anneal. The anneal is typically performed in an inert ambient such as, for example, He or Ar.

As mentioned above, the chemical etchant and etching process described herein can be integrated into any existing semiconductor processing flow, including any CMOS process flow, in which Ge or a Ge-rich SiGe alloy is present and needs to be etched.

While the present disclosure has been particularly shown and described with respect to various embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A method of etching a Ge-rich SiGe alloy in a controlled manner, said method comprising:
    contacting a surface of a Ge-rich SGe alloy layer with a chemical etchant, said Ge-rich SiGe alloy layer comprising 50 atomic % or greater germanium and said chemical etchant comprises a mixture of a halogen-containing acid, hydrogen peroxide, and water, wherein the water is present in an amount of greater than 90% by volume of the total mixture, wherein said halogen-containing acid, said hydrogen peroxide and said water are present in a ratio from 1:15:150 to 1:15:10000.

2. The method of claim 1, wherein said contacting is performed at a temperature from 5° C. to 60° C.

3. The method of claim 1, wherein said halogen-containing acid is hydrofluoric (HF) acid.

4. The method of claim 1, wherein said water is deionized water.

5. The method of claim 1, wherein said deionized water has resistivity of greater than 10 M.ohm.

6. The method of claim 1, wherein said contacting is performed at a temperature of greater than room temperature.

7. The method of claim 1, further comprising forming at least one damaged region within said Ge-rich SiGe alloy layer prior to said contacting, and wherein said contacting removes portions of said Ge-rich SiGe alloy layer that are undamaged relative to said at least one damaged region.

8. The method of claim 1, further comprising providing said chemical etchant prior to said contacting, wherein said providing the chemical etchant comprises mixing, in any order, the halogen-containing acid and the hydrogen peroxide to provide a halogen-containing acid/hydrogen peroxide mixture, and adding water to the halogen-containing acid/hydrogen peroxide mixture.

9. The method of claim 1, wherein said halogen-containing acid comprises hydrofluoric (HF) acid, hydrochloric (HCl) acid, hydrobromic (HBr) acid, hydriodic (HI) acid or any mixtures thereof.

10. The method of claim 1, wherein said halogen-containing acid, said hydrogen peroxide and said water are present in a ratio from 1:15:500 to 1:15:2000.

11. The method of claim 1, wherein said amount of water is greater than 98% by volume of the total mixture.

12. The method of claim 1, wherein said Ge-rich SiGe layer is selected from the group consisting of a polycrystalline silicon germanium alloy and an amorphous silicon germanium alloy.

13. The method of claim 1, wherein said Ge-rich SiGe layer is a single crystalline silicon germanium alloy.

* * * * *